United States Patent
Semenov et al.

(10) Patent No.: US 8,553,803 B2
(45) Date of Patent: Oct. 8, 2013

(54) ESTIMATION OF THE SIGNAL TO INTERFERENCE AND NOISE RATIO (SINR) IN MULTIPLE INPUT MULTIPLE OUTPUT (MIMO) SYSTEMS

(75) Inventors: Sergei Vladimirovich Semenov, Salo (FI); Tomi Petteri Tammilehto, Turku (FI)

(73) Assignee: Nokia Corporation, Espoo (FI)

( * ) Notice: Subject to any disclaimer, the term of this patent is extended or adjusted under 35 U.S.C. 154(b) by 849 days.

(21) Appl. No.: 12/637,710

(22) Filed: Dec. 14, 2009

(65) Prior Publication Data

US 2010/0220811 A1    Sep. 2, 2010

(30) Foreign Application Priority Data

Dec. 12, 2008  (GB) .................................. 0822723.3

(51) Int. Cl.
  *H04L 27/00*        (2006.01)
(52) U.S. Cl.
  USPC ........................... 375/299; 375/347; 375/267
(58) Field of Classification Search
  USPC .......................................... 375/299, 347, 267
  See application file for complete search history.

(56) References Cited

U.S. PATENT DOCUMENTS

| | | | |
|---|---|---|---|
| 2003/0003880 A1* | 1/2003 | Ling et al. .................... | 455/92 |
| 2003/0231606 A1 | 12/2003 | Wu | |
| 2005/0002468 A1* | 1/2005 | Walton et al. .................. | 375/267 |
| 2005/0084027 A1 | 4/2005 | Agin | |
| 2005/0195912 A1* | 9/2005 | Kim et al. ..................... | 375/267 |
| 2007/0157279 A1* | 7/2007 | Hara et al. .................... | 725/124 |

FOREIGN PATENT DOCUMENTS

| | | |
|---|---|---|
| EP | 1700397 A1 | 9/2006 |
| EP | 1760978 A1 | 3/2007 |
| EP | 1804394 A1 | 7/2007 |
| EP | 2068479 A1 | 6/2009 |
| WO | 2005062496 A1 | 7/2005 |
| WO | 2006135653 A1 | 12/2006 |
| WO | 2008033089 A2 | 3/2008 |
| WO | 2008/041677 A1 | 4/2008 |

OTHER PUBLICATIONS

Alamouti, A simple transmitter diversity scheme for wireless communications, IEEE Journal Selected Areas Communications, vol. 16, pp. 1451-1458, Oct. 1998.*

3GPP, 3rd Generation Partnership Project; Technical Specification Group Radio Access Network; Multiple Input Multiple Output in UTRA;(Release 7) 3GPP TR 25.876V7.0.0 Mar. 2007.*

Xiaodong, "subspace-based noise variance and SNR estimation for MIMO OFDM systems," Journal of electronics China Mar. 2006.*

Search Report and Examination Opinion received in corresponding Great Britain Application No. GB0822723.3, Jan. 27, 2010, 3 pages.

(Continued)

*Primary Examiner* — Juan A Torres

(74) *Attorney, Agent, or Firm* — Squire Sanders (US) LLP

(57) ABSTRACT

An apparatus configured to receive a first signal and a second signal from a further apparatus, determine a third signal dependent on at least a first part of the first signal and a first part of the second signal, and generate a parameter value dependent on the third signal.

10 Claims, 5 Drawing Sheets

(56) References Cited

OTHER PUBLICATIONS

International Search Report and Written Opinion of the International Searching Authority for corresponding International Patent Cooperation Treaty Application PCT/IB2009/007745, dated Apr. 30, 2010, pp. 1-12.

Semenov, "Modification of the D-TxAA Scheme for Fading Channel", Proceedings—4th Advanced International Conference on Telecommunications, AICT 2008, Jun. 8, 2008.

3GPP TS 25.211 V8.2.0 (Sep. 2008); 3rd Generation Partnership Project; Technical Specification Group Radio Access Network; Physical Channels and Mapping of Transport Channels, onto Physical Channels (FDD) (Release 8), pp. 29-30.

Chinese Office Action dated May 14, 2013 corresponding to Chinese Patent Application No. 200980149844.X, with English language translation.

Sergei Semenov, "Modification of the D-TxAA scheme for Fading Channel", Nokia, Helsinki, AICT'08, the Fourth Advanced International Conference on Telecommunications, Jun. 30, 2008, pp. 138-142.

Abbreviated Examination Report under Section 18(3) dated Jun. 17, 2013 corresponding to UK Application No. GB0822723.3.

* cited by examiner

ESTIMATION OF THE SIGNAL TO INTERFERENCE AND NOISE RATIO (SINR) IN MULTIPLE INPUT MULTIPLE OUTPUT (MIMO) SYSTEMS

RELATED APPLICATIONS

This application was originally filed as Great Britain Application No. 0822723.3 on Dec. 12, 2008, which is incorporated herein by reference in its entirety.

FIELD OF THE INVENTION

The present invention relates to a method and apparatus and, in particular but not exclusively, to apparatus for use in a multiple input multiple output wireless telecommunications network.

BACKGROUND

It has been proposed to improve the capacity of communication by use of spatial diversity or spatial multiplexing. By using spatial multiplexing, the data rate can be increased by transmitting independent information streams from different antennas but using the same channel as defined by frequency, time slot and/or spreading code.

These systems may be referred to as multiple input multiple output (MIMO) systems where there is more than one transmitting element and more than one receiving element with the spatial multiplexing being the various wireless transmission paths from each of the transmitting elements to each of the receiving elements. These systems require complex controllers to control both the transmitting and receiving elements in apparatus such as base stations and mobile stations using MIMO methods.

Multi-stream single user MIMO transmission has been proposed and forms part of Wideband Code-Division Multiple Access (WCDMA), Third Generation Partnership Project Long Term Evolution (3GPP LTE) and Worldwide Interoperability for Microwave Access (WiMax) system standards. In single user multiple input multiple output (SU-MIMO), a MIMO receiver with multiple antennas and receiving circuitry receives the multiple streams, separates the multiple streams and determines the transmission symbols sent over each stream of the spatially multiplexed data streams.

The application of MIMO methods to wireless communication and in particular to Wideband Code Division Multiple Access (WCDMA) high speed downlink packet access (HSDPA) systems such as the double-transmitter antenna array (D-TxAA) adopted by the third generation partnership project (3GPP) enables a significant increase in data throughput and link range without additional bandwidth or transmit power requirements. These systems thus operate with a higher spectral efficiency (in other words, operate with a greater bits per second per Hertz of bandwidth) than conventional HSDPA implementations and also have a higher link reliability or diversity (in other words reduced susceptibility to fading).

However the application of MIMO systems to WCDMA HSDPA systems is problematic with regards to calculating or estimating the Signal to Interference and Noise Ratio (SINR). In particular it is not practical to use the same methods used in conventional HSDPA approaches to estimate the SINR for D-TxAA HSDPA modes of operation. In conventional WCDMA implementations the SINR is calculated using pilot symbols with a known pattern and signal strength and measuring the difference between the received and expected symbols.

In a MIMO implementation data is typically split into at least two streams and the data symbols are pre-coded with the help of pre-coding weights whilst the pilot symbols are transmitted on a separate channel, the Common Pilot Channel (CPICH), without pre-coding. As the CPICH pilot symbols are not pre-coded, it is not possible to use the conventional SINR estimation methods described above.

SUMMARY

It is an aim of some embodiments of the present invention to address, or at least mitigate, some of these problems. In these embodiments of the invention, we propose a new method that could be used in multiple input multiple output communication systems There is provided according to a first aspect of the invention an apparatus configured to: generate a first pilot signal comprising a combination of a first weighted signal part and a second weighted signal part; transmit the first pilot signal to a further apparatus.

The first weighted signal part is preferably dependent on a first data signal beam forming weighting coefficient, and the second weighted signal part is preferably dependent on a second data signal beam forming weighting coefficient.

The first weighted signal part may comprise the first data signal beam forming weighting coefficient multiplied by a first pilot pattern signal, and the second weighted signal part may comprise the second data signal beam forming weighting coefficient multiplied by a second pilot pattern signal.

The apparatus may be further configured to: generate a second pilot signal comprising a combination of a third weighted signal part and a fourth weighted signal part; and transmit the second pilot signal to the further apparatus.

The third weighted signal part is preferably dependent on a third data signal beam forming weighting coefficient, and the fourth weighted signal part is preferably dependent on a fourth data signal beam forming weighting coefficient.

The third weighted signal part may comprise the third data signal beam forming weighting coefficient multiplied by a first pilot pattern signal, and the fourth weighted part may comprise the fourth data signal beam forming weighting coefficient multiplied by a second pilot pattern signal.

The first and third data signal beam forming weighting coefficients are preferably associated with a first data signal stream, and the second and fourth data signals are preferably associated with a second data signal stream.

The apparatus may be further configured to transmit the first pilot signal from a first antenna element.

The apparatus may be further configured to transmit the second pilot signal from a second antenna element.

The apparatus may comprise at least one of: an access node; a node B; and a base station.

According to a second aspect of the invention there may be provided an apparatus configured to: receive a first signal and a second signal from a further apparatus; determine a third signal dependent on at least a first part of the first signal and a first part of the second signal; and generate a parameter value dependent on the third signal.

The parameter value may comprise at least one of: a signal to noise ratio of a further signal associated with the first signal; a signal to interference ratio of a further signal associated with the first signal; and a signal to interference and noise ratio of a further signal associated with the first signal.

The first signal may comprise an estimate of a first pilot signal associated with the further apparatus first antenna.

The second signal may comprise an estimate of a second pilot signal associated with the further apparatus second antenna.

The apparatus may be further configured to determine the third signal by: summing the product of at least part of the first signal by a first weighting coefficient to the product of at least part of the second signal by a second weighting coefficient; and multiplying the sum by a first pilot pattern signal.

The apparatus may be further configured to pre-calculate the first pilot pattern signal.

The first weighting coefficient may comprise the complex conjugate of a further apparatus first data signal beam forming weighting coefficient, and the second weighting coefficient may comprise the complex conjugate of the further apparatus second data signal beam forming weighting coefficient.

The apparatus may be further configured to: determine a fourth signal dependent on at least the first part of the first signal and the first part of the second signal; and generate a further parameter value dependent on the fourth signal.

The further parameter value may comprise at least one of: a signal to noise ratio of a further signal associated with the second signal; a signal to interference ratio of a further signal associated with the first signal; and a signal to interference and noise ration of a further signal associated with the second signal.

The apparatus may be further configured to determine the fourth signal by: summing the product of at least part of the first signal by a third weighting coefficient to the product of at least part of the second signal by a fourth weighting coefficient; multiplying the sum by a second pilot pattern signal.

The apparatus may be further configured to pre-calculate the second pilot pattern signal.

The third weighting coefficient may comprise the complex conjugate of a further apparatus third data signal beam forming weighting coefficient, and the fourth weighting coefficient may comprise the complex conjugate of the further apparatus fourth data signal beam forming weighting coefficient.

The apparatus may comprise a user equipment.

According to a third aspect of the invention there is provided a method comprising: generating a first pilot signal comprising a combination of a first weighted signal part and a second weighted signal part; and transmitting the first pilot signal to a further apparatus.

The first weighted signal part is preferably dependent on a first data signal beam forming weighting coefficient, and the second weighted signal part is preferably dependent on a second data signal beam forming weighting coefficient.

The method may further comprise: multiplying the first data signal beam forming weighting coefficient by a first pilot pattern signal to generate the first weighted signal part; and multiplying the second data signal beam forming weighting coefficient by a second pilot pattern signal to generate the second weighted signal.

The method may further comprise: generating a second pilot signal comprising a combination of a third weighted signal part and a fourth weighted signal part; and transmitting the second pilot signal to the further apparatus.

The third weighted signal part is preferably dependent on a third data signal beam forming weighting coefficient, and the fourth weighted signal part is preferably dependent on a fourth data signal beam forming weighting coefficient.

The method may further comprise: multiplying the third data signal beam forming weighting coefficient by the first pilot pattern signal to generate the third weighted signal part; and multiplying the fourth data signal beam forming weighting coefficient by the second pilot pattern signal to generate the fourth weighted part.

The first and third data signal beam forming weighting coefficients are preferably associated with a first data signal stream, and the second and fourth data signals are preferably associated with a second data signal stream.

The method may further comprise transmitting the first pilot signal from a first antenna element.

The method may further comprise transmitting the second pilot signal from a second antenna element.

According to a fourth aspect of the invention there is provided a method comprising: receiving a first signal and a second signal from a further apparatus; determining a third signal dependent on at least a first part of the first signal and a first part of the second signal; and generating a parameter value dependent on the third signal.

The parameter value may comprise at least one of: a signal to noise ratio of a further signal associated with the first signal; a signal to interference ratio of a further signal associated with the first signal; and a signal to interference and noise ratio of a further signal associated with the first signal.

The first signal may comprise an estimate of a first pilot signal associated with the further apparatus first antenna.

The second signal may comprise an estimate of a second pilot signal associated with the further apparatus second antenna.

Determining the third signal may comprise: summing, the product of at least part of the first signal by a first weighting coefficient, to the product of at least part of the second signal by a second weighting coefficient; and multiplying the sum by a first pilot pattern signal.

The method may further comprise pre-calculating the first pilot pattern signal.

The first weighting coefficient may comprise the complex conjugate of a further apparatus first data signal beam forming weighting coefficient, and the second weighting coefficient may comprise the complex conjugate of the further apparatus second data signal beam forming weighting coefficient.

The method may further comprise: determining a fourth signal dependent on at least the first part of the first signal and the first part of the second signal; and generating a further parameter value dependent on the fourth signal.

The further parameter value may comprise at least one of: a signal to noise ratio of a further signal associated with the second signal; a signal to interference ratio of a further signal associated with the first signal; and a signal to interference and noise ration of a further signal associated with the second signal.

The method may further comprise determining the fourth signal by: summing, the product of at least part of the first signal by a third weighting coefficient, to the product of at least part of the second signal by a fourth weighting coefficient; and multiplying the sum by a second pilot pattern signal.

The method may further comprise pre-calculating the second pilot pattern signal.

The third weighting coefficient may comprise the complex conjugate of a further apparatus third data signal beam forming weighting coefficient, and the fourth weighting coefficient may comprise the complex conjugate of the further apparatus fourth data signal beam forming weighting coefficient.

According to a fifth aspect of the invention there is provided a computer-readable medium encoded with instructions that, when executed by a computer, perform: generating a first pilot signal comprising a combination of a first weighted signal part and a second weighted signal part; and transmitting the first pilot signal to a further apparatus.

According to a sixth aspect of the invention there is provided a computer-readable medium encoded with instructions that, when executed by a computer, perform: receiving a first signal and a second signal from a further apparatus; determining a third signal dependent on at least a first part of the first signal and a first part of the second signal; and generating a parameter value dependent on the third signal.

An electronic device may comprise apparatus as described above.

A chipset may comprise apparatus as described above.

BRIEF DESCRIPTION OF THE DRAWINGS

The present invention is now described by way of example only with reference to the accompanying Figures, in which.

DESCRIPTION OF EXEMPLARY EMBODIMENTS

Embodiments of the present invention are described herein by way of particular examples and specifically with reference to exemplary embodiments. It will be understood by one skilled in the art that the invention may not be limited to the details of the specific embodiments given herein.

Figure 1:
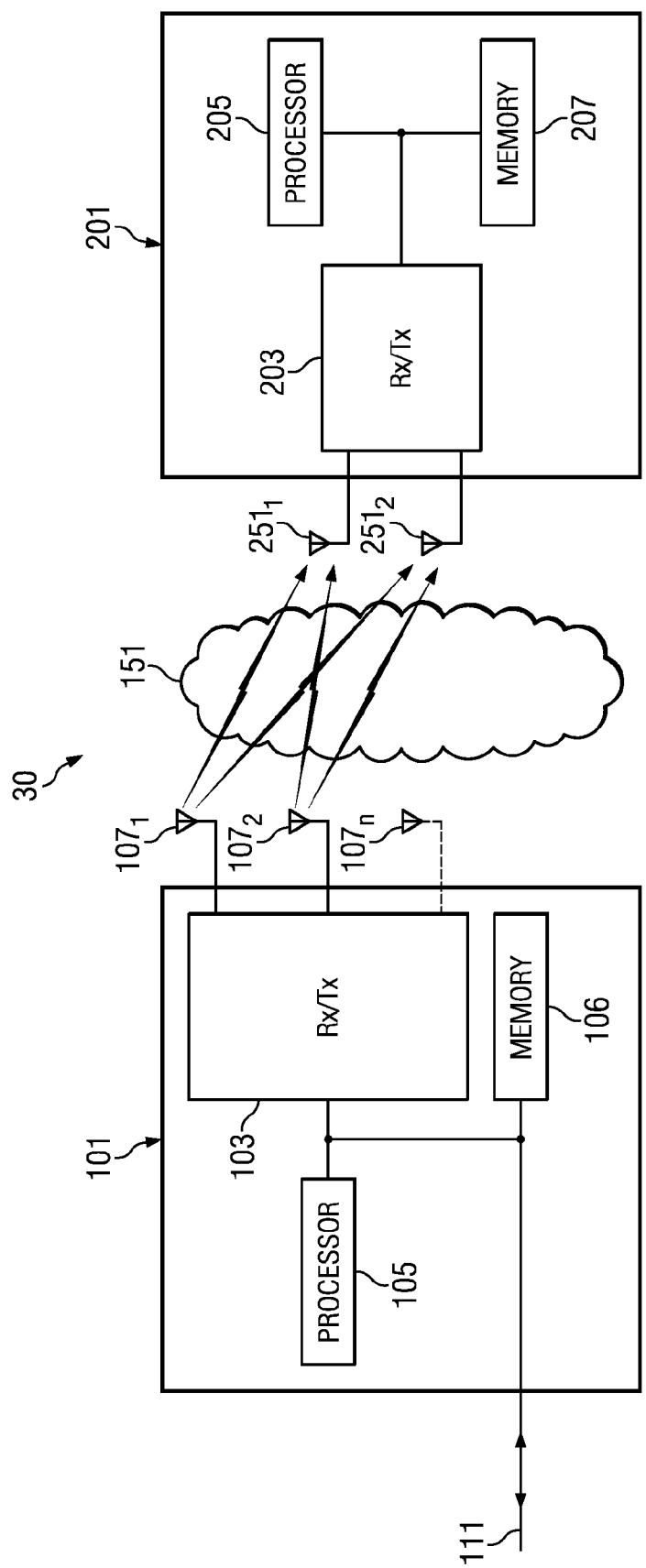
FIG. 1 shows a schematic view of a system including an schematic base station and user equipment configuration within which embodiments of the invention may be implemented.

FIG. 1 shows a communication network 30 in which some embodiments of the present invention may be implemented. In particular, some embodiments of the present invention may relate to the implementation of radio modulators/demodulators (modems) for a range of devices that may include: user equipment 201, access points or base stations 101 which communicate over a wireless environment 151. Furthermore, embodiments of the present invention may be applicable to communication networks implemented according to a range of standards including: WCDMA (Wideband Code Division Multiple Access), 3GPP LTE (Long Term Evolution), WiMax (Worldwide Interoperability for Microwave Access), UMB (Ultra Mobile Broadband), CDMA (Code Division Multiple Access), 1×EV-DO (Evolution-Data Optimized), WLAN (Wireless Local Area Network), UWB (Ultra-Wide Band) receivers.

With respect to FIG. 1, a schematic view of a system within which an embodiment of the invention may be implemented is shown. The communication system 30 is shown with a base station 101 which may be a node B (NB), an enhanced node B (eNB) or any access server suitable for enabling user equipment 201 to access wirelessly a communication system.

FIG. 1 shows a system whereby the base station (BS) 101 may transmit to the user equipment (UE) 201 via the wireless environment communications channel 151, which may be known as the downlink (DL) channel, and the user equipment (UE) 201 may transmit to the base station (BS) 101 via the wireless environment communications channel 151, which may be known as the uplink (UL) channel.

The base station 101 may comprise a processor 105 which may be configured to control the operation of the receiver/transmitter circuitry 103. The processor may be configured to run software stored in memory 106.

The memory 106 may be further configured to store data to be transmitted and/or received. The memory 106 may further be used to store configuration parameters used by the processor 105 in operating the base station 101. The memory may be solid state memory, optical memory (such as, for example, CD or DVD format data discs), magnetic memory (such as floppy or hard drives), or any media suitable for storing the programs for operating the processors, configuration data or transmission/reception data.

The transmitter/receiver circuitry 103 may be configured to operate as a configurable transmitter and/or receiver converting between radio frequency signals of a specific protocol for transmission over (or reception via) the wireless environment and baseband digital signals. The transmitter/receiver circuitry 103 may be configured to use the memory 106 as a buffer for data to be transmitted over or received from the wireless environment 151.

The transmitter/receiver circuitry 103 may further be configured to be connected to at least two antennas for receiving and transmitting the radio frequency signals over the wireless environment to the user equipment 201. In FIG. 1 the base station is shown comprising 2 antennas, the first antenna $107_1$ and the second antenna $107_2$ both configured to transmit and receive signals. In other embodiments of the invention the base station may have more antennas represented by the dotted antenna $107_n$ in FIG. 1.

The base station 101 may be connected to other network elements via a communications link 111. The communications link 111 may receive data to be transmitted to the user equipment 201 via the downlink and transmits data received from the user equipment 201 via the uplink. This data may comprise data for all of the user equipment within the cell or wireless communications range operated by the base station 101. The communications link 111 is shown in FIG. 1 as a wired link. However it would be understood that the communications link may further be a wireless communications link.

In FIG. 1, there is shown an apparatus or user equipment 201 within the range of the base station 101. However it would be understood that there may be more user equipment 201 within range of the base station 101. The user equipment may be a mobile station, or any other apparatus or electronic device suitable for communication with the base station. For example in further embodiments of the invention the user equipment may be a personal data organiser or laptop computer suitable for wireless communication in the environment as described hereafter.

Furthermore FIG. 1 shows in detail the user equipment UE 201. The apparatus or user equipment 201 may comprise a processor 205 configured to control the operation of a receiver/transmitter circuitry 203. The processor may be configured to run software stored in memory 207. The processor may further control and operate any operation required to be carried out by the user equipment such as operation of the user equipment display, audio and/or video encoding and decoding in order to reduce spectrum usage, etc. However these additional operations as well as known or standard operations of such apparatus is not described in any further detail as they do not assist in the understanding of the operation of the invention with respect to the apparatus 201.

The memory 207 may be further configured to store data to be transmitted and/or received. The memory 207 may further be used to store configuration parameters used by the processor 205 in operating the user equipment 201. The memory may be solid state memory, optical memory (such as, for example, CD or DVD format data discs), magnetic memory (such as floppy or hard drives), or any media suitable for storing the programs for operating the processors, configuration data or transmission/reception data.

The transmitter/receiver circuitry 203 may be configured to operate as a configurable transmitter and/or receiver converting between radio frequency signals of a specific protocol for transmission over (or reception via) the wireless environment and baseband digital signals. The transmitter/receiver circuitry 203 may be configured to use the memory 207 as a buffer for data to be transmitted over or received from the wireless environment 151.

The transmitter/receiver circuitry 203 may further be configured to be connected to at least one antenna for receiving and transmitting the radio frequency signals over the wireless environment to the base station 101. In FIG. 1 the user equipment is shown comprising 2 antennas, the first antenna $251_1$ and the second antenna $251_2$. In a first embodiment of the invention both the first $251_1$ and the second $251_2$ antenna may be used for receiving but only the first antenna $251_1$ may be configured to be used for transmitting. However it would be appreciated that in other embodiments of the invention different numbers of antennas may be connected to transmitter/receiver circuitry 203 and different numbers of antennas used for transmitting and receiving the signals over the wireless environment 151.

Although FIG. 1 and the examples described hereafter describe the user equipment as having a processor arranged to carry out the operations described below, it would be understood that in embodiments of the invention the user equipment may comprise separate circuitry or processors configured to carry out separate processes. For example in some embodiments of the invention digital signal processors suitable for performing matrix and/or vector calculations may be used to perform the matrix calculations described hereafter.

Figure 2:
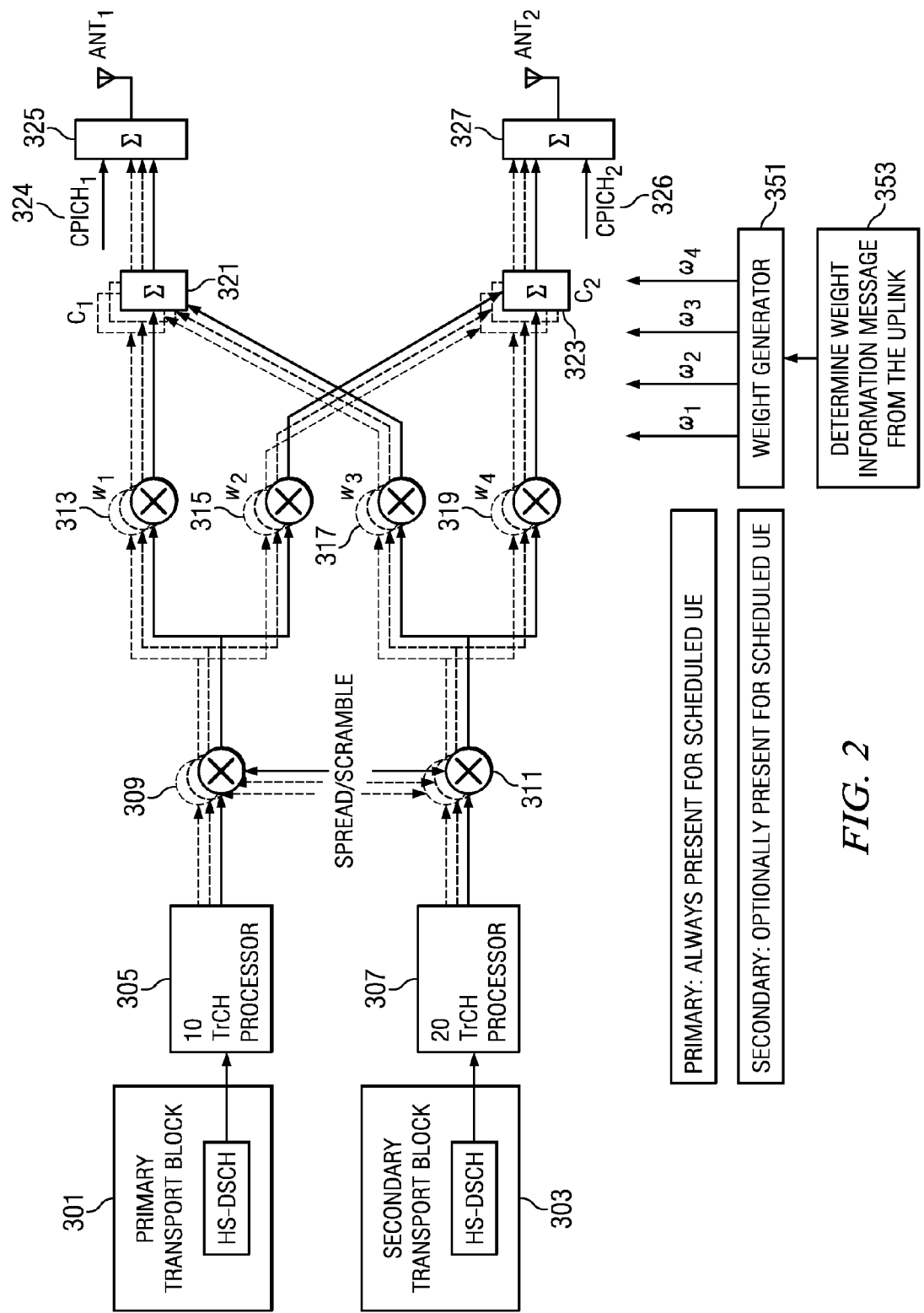
FIG. 2 shows a schematic view of a transmitter within which embodiments of the invention may be implemented.
Figure 3:
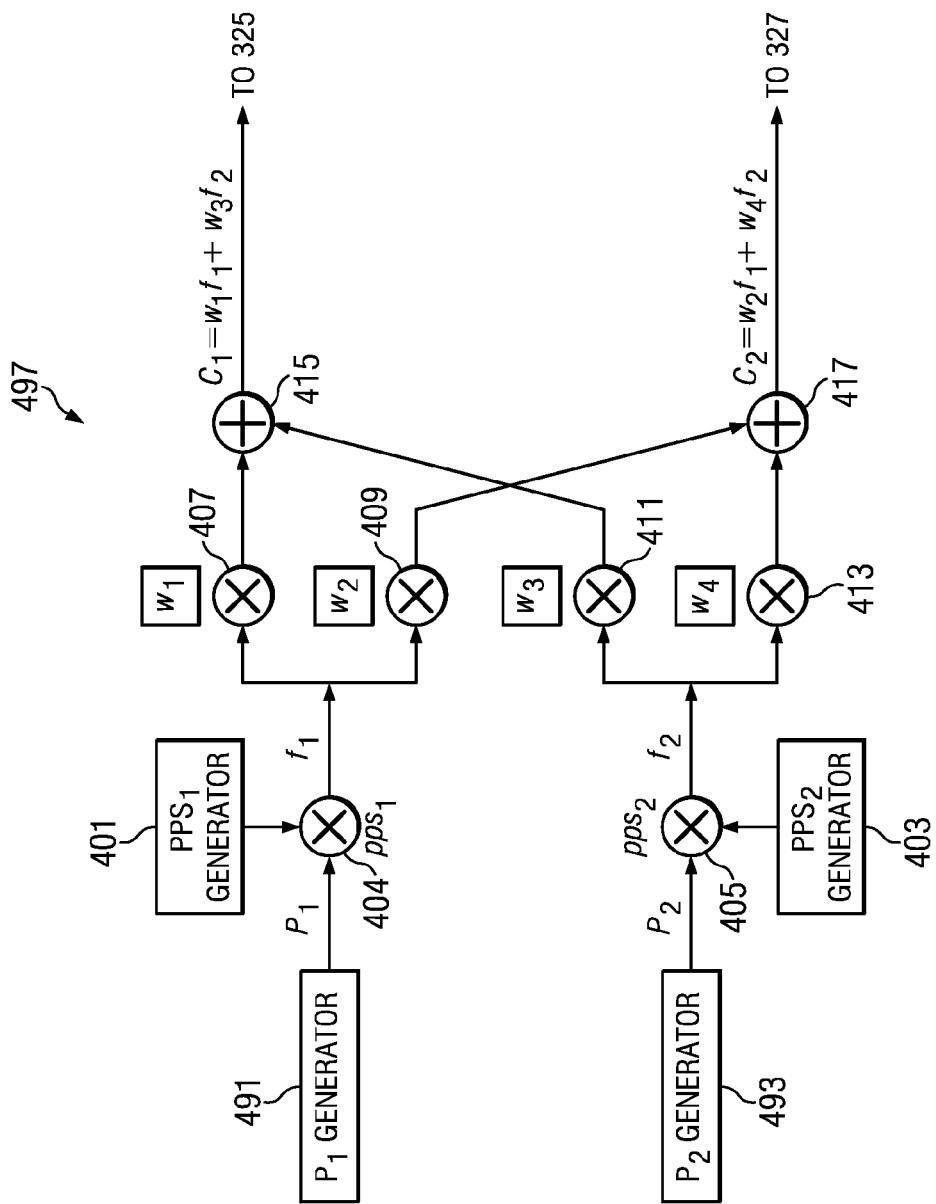
FIG. 3 shows a further schematic view of a transmitter within which embodiments of the invention may be implemented.

With respect to FIGS. 2 and 3 a transmitter such as that implemented in the base station apparatus 101 for operating a downlink channel to the user equipment apparatus 201 is shown. It would be understood that the transmitter may be implemented in embodiments of the invention by configuring the processor 105, memory 106, and transceiver circuitry 103. The operation of the transmitter is further shown as a flow diagram in FIG. 5.

The transmitter is shown in this example as being configured to divide the transmission of data information (or data channel) into two streams, each of which are transmitted by each of the two antennas $107_1$ and $107_2$. Furthermore the pilot information (or pilot channel) is also transmitted by each of the two transmitters. The data may be divided into a primary data transport block for the first stream of the high speed downlink shared channel 301 and a secondary transport block for the second stream of the high speed downlink shared channel 303. In embodiments of the invention it may be possible to use the transmitter for both conventional HSDPA and MIMO HSDPA implementations. The primary transport block 301 (or first data stream) may be present in both conventional and MIMO implementations. The secondary transport block 303 (or second data stream) may be used in MIMO implementations. The size of the secondary transport block does not depend on the size of the primary transport block. The apparatus configured to process the secondary transport block data is shown in FIG. 2 is marked by a dot.

The primary transport block 301 data is passed to the primary transport channel (TrCH) processor 305. The primary transport channel processor 305 performs transport channel processing as known in the art. For example according to 3GPP standard 25.212 the transport channel processor 305 may receive data with a maximum rate of a transport block every transmission time interval. The transmission time interval may be 2 ms which is mapped to a radio sub-frame of 3 slots.

Furthermore in embodiments of the invention the transport channel processor 305 may carry out the following coding steps:

adding a cyclic redundancy check (CRC) to each transport block;
performing a bit scrambling;
performing a code block segmentation;
performing a channel coding;
adding a hybrid acknowledgement request (HARQ);
segmenting the physical channel;
interleaving the data for the High Speed Data Shared Channel (HS-DSCH);
re-arranging the symbol constellation for 16 position Quadrature Amplitude Modulation (16 QAM) and 64 position Quadrature Amplitude Modulation (64 QAM); and
mapping to the physical channels.

The primary transport channel processor 305 then passes the processed data to the primary stream data channel spreader/scrambler 309.

The primary stream data channel spreader/scrambler 309 receives the spreading/scrambling code as well as the output of the primary transport channel processor 305 and outputs scrambled data to the primary stream data channel first antenna multiplier 313 and the primary stream data channel second antenna multiplier 315.

The primary stream data channel first antenna multiplier 313 multiplies the scrambled data by the first beamforming weighting coefficient $w_1$ and outputs the product to the first antenna data adder 321.

The primary stream data channel second antenna multiplier 315 multiplies the scrambled data by the second beamforming weighting coefficient $w_2$ and passes this information to the second antenna data adder 323.

In a similar manner the secondary transport block 303 data is passed to the secondary transport channel (TrCH) processor 307. The secondary transport channel processor 307 performs transport channel processing as known in the art and described above with respect to the primary transport channel processor 305. The secondary transport channel processor 307 then passes the processed data to the secondary stream data channel spreader/scrambler 311.

The secondary stream data channel spreader/scrambler 311 receives the spreading/scrambling code as well as the output of the secondary transport channel processor 307 and outputs scrambled data to the secondary stream data channel first antenna multiplier 317 and the secondary stream data channel second antenna multiplier 319.

The secondary stream data channel first antenna multiplier 317 multiplies the scrambled data by the third beamforming weighting coefficient $w_3$ and outputs the product to the first antenna data adder 321.

The secondary stream data channel second antenna multiplier 319 multiplies the scrambled data by the fourth beamforming weighting coefficient $w_4$ and passes this information to the second antenna data adder 323.

The first antenna data adder 321 adds the weighted outputs from the primary and secondary streams of the transport/data channel and passes these to the first antenna adder 325.

The first antenna adder 325 receives both the output of the first antenna data adder 321 and the first antenna pilot signal CPICH$_1$ 324 and outputs the combination towards the antenna.

Similarly the second antenna data adder 323 adds the weighted outputs from the primary and secondary streams of the transport/data channel and passes these to the second antenna adder 327.

The second antenna adder 327 receives both the output of the second antenna data adder 323 and the second antenna pilot signal CPICH$_2$ 326 and outputs the combined stream towards the second antenna.

It would be appreciated that there may be further processing carried out on the combined data and pilot signals output to either of the antennas. For example the combined signals may be converted into transmission symbols, or modulated by a higher frequency modulation carrier signal. However these are not described in detail to simplify the understanding of the invention.

The weighting generator 351 generates the beamforming weighting coefficients $w_1$, $w_2$, $w_3$ and $w_4$, dependent on the weight determining function 353. The weight determining function 353 in embodiments of the invention the beamforming weighting coefficients are determined by receiving the precoding control information (PCI) from the uplink.

Figure 5:
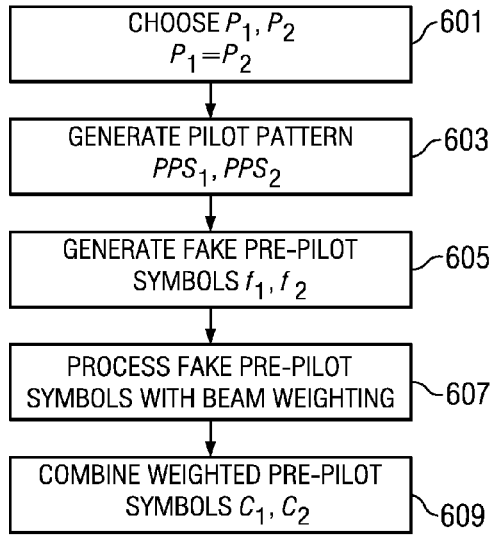
FIG. 5 shows a flow chart representation of a method of operating the transmitter shown in FIGS. 2 and 3 according to embodiments of the invention.

The pilot signal generator 497 generation of the pilot signals for the first antenna $C_1$ and the second antenna $C_2$ according to embodiments of the invention is described in further detail in FIGS. 3 and 5. The pre-pilot processing, which is described below and shown in FIGS. 3 and 5 describes a 'fake processing' operation and the output of the pilot signal generator 497 is the signals $C_1$, for the first antenna, and $C_2$, for the second antenna, as shown in the pilot signals for the first and second antennas CPICH$_1$ and CPICH$_2$ from FIG. 2.

Thus the following is described in order to show the possible representations of pilot signals for the first antenna $C_1$ and the second antenna $C_2$ as a result of encoding of a pre-pilot symbol or signal. These processing operations may not be implemented in embodiments of the invention. In these embodiments of the invention the transmitter, which in this example is the base station, therefore does not require any modifications.

As can be seen, a conventional use of the pilot symbols in the CPICH channels cannot be used directly as the beamforming weighting coefficients $w_1$, $w_2$, $w_3$ and $w_4$, have not been applied to the pilot symbols. However by applying the beamforming weighting coefficients to the fake pre-pilot signals the decoder is able to use this knowledge to calculate the signal to interference noise ratio.

Firstly, the Primary pre-pilot stream symbol generator 491 generates or chooses the primary pre-pilot stream symbol $P_1$. The primary pre-pilot power generator 491 may then output the primary pre-pilot stream symbol $P_1$ to the primary fake pre-pilot generator 404. In a similar manner the Secondary pre-pilot stream symbol generator 493 generates or chooses the secondary pre-pilot stream symbol $P_2$. The secondary pre-pilot stream symbol generator 493 may then output the secondary pre-pilot stream symbol $P_2$ to the secondary fake pre-pilot generator 405. In a first embodiment of the invention the primary pre-pilot stream symbol generator 491 and secondary pre-pilot stream symbol generator are configured to choose the values of $P_1=P_2=1$.

The step of generating the primary and secondary pre-pilot stream symbols $P_1$ and $P_2$ is shown in FIG. 5 by step 601.

The pilot patterns for a primary PPS$_1$ and secondary PPS$_2$ pre-pilot pattern are generated by the primary pre-pilot pattern generator 401 and the secondary pre-pilot pattern generator 403 respectively.

The primary pre-pilot pattern generator 401 and secondary pre-pilot pattern generator 403 may generate the primary pre-pilot pattern PPS$_1$ and secondary pre-pilot pattern PPS$_2$ using the pilot patterns for the first antenna pp$_1$ and the second antenna pp$_2$. The pilot patterns for the first antenna pp$_1$ and the second antenna pp$_2$ may be generated using any know pilot pattern generating process. For example the pilot patterns may be generated according to the method described in 3GPP standard TS 25.211 chapter 5.3.3.1. In a first embodiment of the invention pp$_1$ and pp$_2$ are the pilot patterns for transmitter antenna 1 and transmitter antenna 2 respectively, and the primary pre-pilot pattern PPS$_1$ may be derived as:

$$pps_1 = pp_1 \cdot w_1^* + pp_2 \cdot w_2^*,$$

and the secondary pre-pilot pattern PPS$_2$ as:

$$pps_2 = pp_1 \cdot w_3^* + pp_2 \cdot w_4^*,$$

where $w_x^*$ is the complex conjugate of $w_x$.

The primary pre-pilot pattern PPS$_1$ is output to the primary fake pre-pilot generator 404, and the secondary pilot pattern PPS$_2$ is output to the secondary fake pre-pilot generator 405

The generation of the primary and secondary pilot patterns is shown in FIG. 5 by step 603.

The primary fake pre-pilot generator 404 and the secondary fake pre-pilot generator 405 generate the primary fake pre-pilot signal $f_1$ and the secondary fake pre-pilot signal $f_2$ respectively. The primary fake pre-pilot generator 404 may generate the primary fake pre-pilot signal $f_1$ using the following equation:

$$f_1 = P_1 \times pps_1.$$

Similarly the secondary fake pre-pilot generator 405 may generate the secondary fake pre-pilot signal $f_2$ using the following equation:

$$f_2 = P_2 \times pps_2.$$

The primary fake pre-pilot symbol $f_1$ is passed to the first beam multiplier 407 and the second beam multiplier 409 and the secondary fake pre-pilot symbol $f_2$ is passed to the third beam multiplier 411 and the fourth beam multiplier 413.

The generation of the fake pre-pilot symbols $f_1$ and $f_2$ is shown in FIG. 5 by step 605.

The first beam multiplier 407 multiplies the primary fake pre-pilot symbol $f_1$ and the first beamforming weighting coefficient $w_1$ and outputs the product to the first antenna pilot signal adder 415.

The second beam multiplier 409 multiplies the primary fake pre-pilot symbol $f_1$ and the second beamforming weighting coefficient $w_2$ and outputs the product to the second antenna pilot signal adder 417.

The third beam multiplier 411 multiplies the secondary fake pre-pilot symbol $f_2$ and the third beamforming weighting coefficient $w_3$ and outputs the product to the first antenna pilot signal adder 415.

The fourth beam multiplier 413 multiplies the secondary fake pre-pilot symbol $f_2$ and the fourth beamforming weighting coefficient $w_4$ and outputs the product to the second antenna pilot signal adder 417.

The processing of the fake pre-pilot signals by the beam weighting vectors is shown in FIG. 5 by step 607.

The first antenna pilot signal adder 415 combines the products from the first and third beam multipliers 407 and 411 to generate a first antenna pilot symbol $C_1$ so that:

$$C_1 = w_1 f_1 + w_3 f_2.$$

The first antenna pilot symbol $C_1$ may be passed to the first antenna adder 325 as shown in FIG. 2.

The second antenna pilot signal adder 417 combines the products from the second and fourth beam multipliers 409 and 413 to generate a second antenna pilot symbol $C_2$ so that:

$$C_2 = w_2 f_1 + w_4 f_2.$$

The second antenna pilot symbol $C_2$ may be passed to the second antenna adder 327 as shown in FIG. 2.

The combination of the weighted pre-pilot symbols to generate the antenna pilot symbols $C_1$ and $C_2$ is shown in FIG. 5 by step 609.

In such a way it is possible to generate pilot symbols which has been pre-coded using the weighting functions the same as the weighting functions applied to the data for which the signal to interference and noise ratio (SINR) is applicable. However the embodiments of the invention may further involve the receiver, in other words the user equipment or apparatus 201 to which the signal is intended for.

Figure 4:
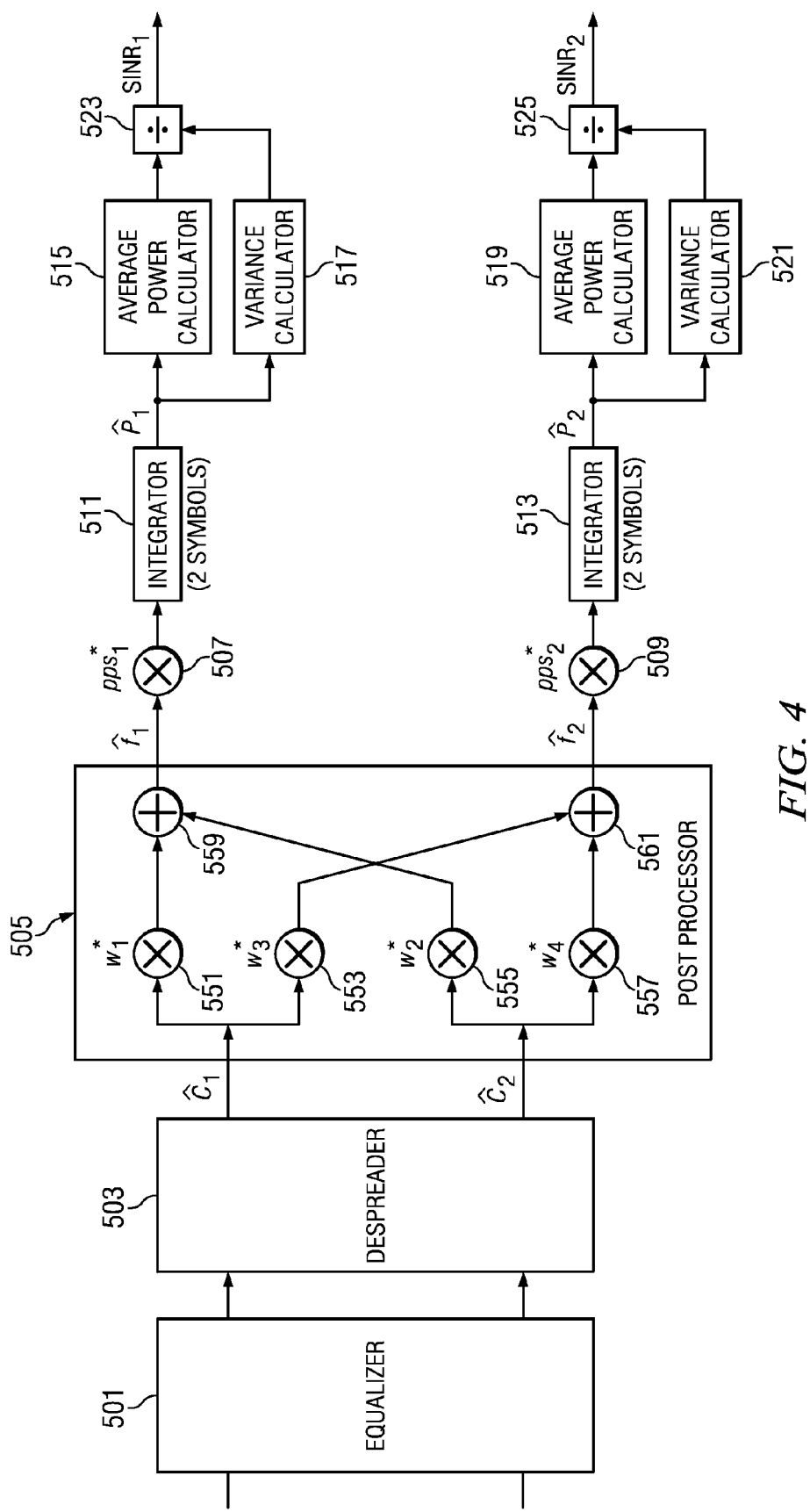
FIG. 4 shows a schematic view of a receiver within which embodiments of the invention may be implemented.
Figure 6:
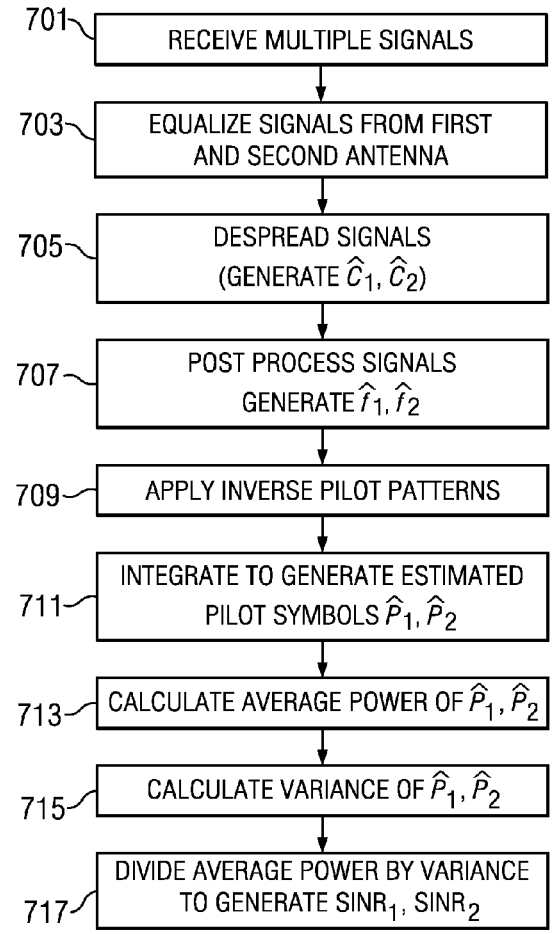
FIG. 6 shows a flow chart representation of a method of operating the receiver shown in FIG. 4 according to embodiments of the invention.

With respect to FIGS. 4 and 6, the embodiments of the invention implemented within the receiver part, is shown. A receiver such as that implemented in the user equipment apparatus 201 receiving a downlink channel from the base station 201 is shown. It would be understood that the receiver may be implemented in embodiments of the invention by configuring the processor 205, memory 207, and transceiver circuitry 203 of the apparatus 201. The operation of the receiver is further shown as a flow diagram in FIG. 6.

The SINR for each stream in embodiments of the invention may be calculated by using the output of an equalizer in the receiver.

In other embodiments and with respect to FIGS. 4 and 6 embodiments of the invention may be described whereby the SINR may be calculated by using the pilot channel information.

The receiver receives signals from the antennas and outputs signal streams representing the signals received. Although not described in detail these signals may be processed in order to demodulate and also may be de-multiplex the signals to separate out the signals representative of the data streams and the signals representative of the pilot streams.

The receiving of signals at the first and second antennas is shown in FIG. 6 by step 701.

The equalizer 501 receives the output of the receiver. The equalizer 501 may perform equalization on both the data and pilot signals as known in the art.

In order to simplify the explanation of embodiments of the invention the remainder of the outputs are described with respect to the pilot signals received and the processing of the received data is not described as it is not directly relevant to the embodiments of the invention hereafter described.

The output of the equalizer 501 corresponding to the first and second transmitter antennas is passed to the despreader 503.

The equalization of the receiver signals from the first and second receiver antennas is shown in FIG. 6 by step 703.

The first antenna pilot signals and second antenna pilot signals are then despread using the reverse of the spreading codes implemented in the spreaders in the transmitter. The output of the despreader 503 results in an estimate of the first antenna pilot signal $\hat{C}_1$ and second antenna pilot signal $\hat{C}_2$.

The estimates for the first and second antennas pilot signals are passed to the post-processor 505.

The despreading of the received pilot signals to generate the estimate of the pilot antenna symbols $C_1$ and $C_2$ is shown in FIG. 6 by step 705.

The post-processor 505 receives the first and second antenna pilot signal estimates and outputs the estimates of the primary and secondary fake pre-pilot symbols $\hat{f}_1$ and $\hat{f}_2$.

The post-processor 505 therefore receives the first antenna pilot signal estimate $\hat{C}_1$ and passes the first antenna pilot signal estimate $\hat{C}_1$ to a first and third beamforming weighting multiplier 551 and 553. The post processor 505 also receives the second result symbol estimate $\hat{C}_2$ and passes the second result symbol estimate $\hat{C}_2$ to the second and fourth beamforming weighting multiplier 555 and 557.

The first beamforming weighting multiplier 551 multiplies the first antenna pilot signal estimate $\hat{C}_1$ with the complex conjugate of the first beamforming weighting coefficient $w^*_1$ and outputs the product to the primary pilot estimator multiplexer 559.

The third beamforming weighting multiplier 553 multiplies the first antenna pilot signal estimate $\hat{C}_1$ with the complex conjugate of the third beamforming weighting coefficient $w^*_3$ and outputs the product to the secondary pilot estimator multiplexer 561.

The second beamforming weighting multiplier 555 multiplies the second antenna pilot signal estimate $\hat{C}_2$ by the complex conjugate of the second beamforming weighting coefficient $w^*_2$ and outputs the product to the primary pilot estimator multiplexer 559.

The fourth beamforming weighting multiplier 557 multiplies the second antenna pilot signal estimate $\hat{C}_2$ by the complex conjugate of the fourth beamforming weighting coefficient $w^*_4$ and outputs the product to the secondary pilot estimator channel multiplexer 561.

The primary pilot estimator multiplexer 559 generates an estimate for the primary fake pre-pilot symbol $\hat{f}_1$ by combining the outputs of the first and second beamforming weighting multipliers according to the following equation:

$$\hat{f}_1 = \hat{C}_1 w^*_1 + \hat{C}_2 w^*_2$$

The secondary pilot estimator multiplexer 561 generates an estimate for the secondary fake pre-pilot symbol $\hat{f}_2$ by combining the outputs of the third and fourth weighting beamforming weighting according to the following equation:

$$\hat{f}x_2 = \hat{C}_1 w^*_3 + \hat{C}_2 w^*_4$$

The post processing of the pilot signal estimates to generate the primary and secondary fake pre-pilot symbol estimates is shown in FIG. 6 by step 707.

The primary fake pre-pilot symbol estimate $\hat{f}_1$ is passed to the primary pilot pattern multiplier 507 where the primary fake pre-pilot symbol estimate is multiplied by the complex conjugate of the primary pilot pattern $PPS^*_1$ and the product of which is passed to the primary integrator 511.

The secondary fake pre-pilot symbol estimate $\hat{f}_2$ is passed to the secondary pilot pattern multiplier 509 where secondary fake pre-pilot symbol estimate $\hat{f}_2$ is multiplied by the complex conjugate of the secondary pilot pattern $PPS^*_2$ and the product of which is passed to the secondary integrator 513.

The complex conjugates of the primary pre-pilot pattern $PPS_1^*$ and secondary pre-pilot pattern $PPS_2^*$ may be generated at the receiver by using knowledge of the pilot patterns for the first antenna $pp_1$ and the second antenna $pp_2$ and knowledge of the weighted coefficients $w_1$, $w_2$, $w_3$, $w_4$ in a manner similar to the generation of the primary pre-pilot pattern and secondary pre-pilot pattern.

In embodiments of the invention there may be four possible values for the pair of the complex conjugates of the primary pre-pilot pattern $PPS_1^*$ and secondary pre-pilot pattern $PPS_2^*$ therefore in embodiments of the invention these values may be pre-calculated and used dependent on the values of the weighted coefficients $w_1, w_2, w_3, w_4$.

The application of the complex conjugate of the pilot patterns to the first and second fake pre-pilot symbol estimates is shown in FIG. 6 by step 709.

The primary integrator 511 integrates the output of the primary pilot pattern multiplier 507 to generate an estimate of the primary pre-pilot stream symbol $\hat{P}_1$.

Similarly the secondary integrator 513 integrates the output of the secondary pilot pattern multiplier 509 to generate an estimate of the secondary pre-pilot stream symbol $\hat{P}_2$.

In a first embodiment of the invention, two successive outputs from the pilot pattern multipliers are integrated to produce the pre-pilot stream symbol estimate. However it would be appreciated that more outputs may be combined in further embodiments of the invention in other embodiments. The number of symbols to integrate should be even.

The output of the primary integrator 511 is passed to a primary average power calculator 515 and a primary variance calculator 517.

The output of the secondary integrator 513 is passed to a secondary average power calculator 519 and a secondary variance calculator 521.

The integration operation to generate the estimated pilot symbols for the primary and secondary pre-pilot stream symbols is shown in FIG. 6 by step 711.

The primary average power calculator 515 receives the primary estimated pre-pilot stream symbols $\hat{P}_1$ and generates a primary average power value. The primary average power calculation estimate is passed to a primary divider 523.

The secondary average power calculator 519 receives the secondary estimated pre-pilot stream symbols $\hat{P}_2$ and generates a secondary average power value. The secondary average power calculation estimate is passed to a secondary divider 525.

The calculation of the average power for the primary and secondary estimated pre-pilot stream symbols is shown in FIG. 6 by step 713.

The primary variance calculator 517 receives the estimated values of the pre-pilot stream symbols $\hat{P}_1$ and generates the estimated variance of the pre-pilot stream symbols $\hat{P}_1$. The output of the primary variance calculator 517 is passed to the primary divider 523.

The secondary variance calculator 521 receives the estimated values of the pre-pilot stream symbols $\hat{P}_2$ and generates the estimated variance of the pre-pilot stream symbols $\hat{P}_2$. The output of the secondary variance calculator 521 is passed to the secondary divider 525.

The variance calculation of the estimated pilot symbols is shown in FIG. 6 by step 715.

In a first embodiment of the invention the average power calculator and the variance calculator generate one output using a sampling window of 15 symbols. In other words the estimates are based upon the last 15 symbols estimated. In other words, two milliseconds (or the equivalent to a transmission time interval (TTI) or frame length) in this way the power of $\hat{P}_1$ corresponds to the power of the first data stream and the variance of $\hat{P}_1$ gives the power of interference originating from the second data stream, other channels and thermal noise and other cell interference.

In other embodiments of the invention other window lengths and window profiles may be selected.

The primary divider 523 generates an estimate of the signal to interference and noise ratio associated with the first data stream by dividing the average power value by the variance value. Similarly the secondary divider 525 generates an estimate of the signal to interference and noise ratio associated with the second data stream by dividing the average power value by the variance value.

The calculation of the signal to interference noise ratio by dividing the average power by variance is shown in FIG. 6 by step 717.

As the pre-pilot symbols are encoded in the same way as the data, the results symbols $C_1$ and $C_2$ coincide with the pilot symbols for transmitter antenna 1 and transmitter antenna 2 without pre-coding. The correlation of the output of the post-processing which gives the estimate of the pre-pilot symbol $\hat{f}_1$ with the pilot pattern of stream 1 $PPS_1$ gives the estimate of the symbol $P_1$ as originally chosen.

The embodiments of the invention significantly decrease the complexity of the signal to interference noise ratio as given above. Thus separating the equalization tapsolving from the signal to interference ratio estimation makes Application Specific Instruction Set Processor (ASIP) scheduling easier.

It is noted that whilst embodiments may have been described in relation to user equipment or mobile devices such as mobile terminals, embodiments of the present invention may be applicable to any other suitable type of apparatus suitable for communication via access systems. A mobile device may be configured to enable use of different access technologies, for example, based on an appropriate multi-radio implementation.

It is also noted that although certain embodiments may have been described above by way of example with reference to the exemplifying architectures of certain mobile networks and a wireless local area network, embodiments may be applied to any other suitable forms of communication systems than those illustrated and described herein. It is also noted that the term access system may be understood to refer to any access system configured for enabling wireless communication for user accessing applications.

The above described operations may require data processing in the various entities. The data processing may be provided by means of one or more data processors. Similarly various entities described in the above embodiments may be implemented within a single or a plurality of data processing entities and/or data processors. Appropriately adapted computer program code product may be used for implementing the embodiments, when loaded to a computer. The program code product for providing the operation may be stored on and provided by means of a carrier medium such as a carrier disc, card or tape. A possibility may be to download the program code product via a data network Implementation may be provided with appropriate software in a server.

For example the embodiments of the invention may be implemented as a chipset, in other words a series of integrated circuits communicating among each other. The chipset may comprise microprocessors arranged to run code, application specific integrated circuits (ASICs), or programmable digital signal processors for performing the operations described above.

Embodiments of the inventions may be practiced in various components such as integrated circuit modules. The design of integrated circuits can be by and large a highly automated process. Complex and powerful software tools may be available for converting a logic level design into a semiconductor circuit design ready to be etched and formed on a semiconductor substrate.

Programs, such as those provided by SYNOPSYS, Inc. of Mountain View, Calif. and CADENCE DESIGN, of San Jose, Calif. may automatically route conductors and locate components on a semiconductor chip using well established rules of design as well as libraries of pre-stored design modules. Once the design for a semiconductor circuit may have been completed, the resultant design, in a standardized electronic format (e.g., Opus, GDSII, or the like) may be transmitted to a semiconductor fabrication facility or "fab" for fabrication.

It is noted herein that while the above describes exemplifying embodiments of the invention, there are several variations and modifications which may be made to the disclosed solution without departing from the scope of the present invention as defined in the appended claims.

The invention claimed is:

1. An apparatus comprising:
a receiver for receiving a first signal and a second signal from a transmitter, the apparatus configured to:
determine a third signal dependent on at least a first part of the first signal and a first part of the second signal, wherein the third signal is determined by summing the product of at least part of the first signal by a first weighting coefficient to the product of at least part of the second signal by a second weighting coefficient, and multiplying the sum by a first pilot pattern signal; and
generate a parameter value dependent on the third signal.

2. The apparatus as claimed in claim 1, wherein the parameter value comprises at least one of:
a signal to noise ratio of a further signal associated with the first signal;
a signal to interference ratio of a further signal associated with the first signal; and
a signal to interference and noise ratio of a further signal associated with the first signal.

3. The apparatus as claimed in claim 1, wherein the first signal comprises an estimate of a first pilot signal associated with the further apparatus first antenna.

4. The apparatus as claimed in claim 1, wherein the second signal comprises an estimate of a second pilot signal associated with the further apparatus second antenna.

5. The apparatus as claimed in claim 1, further comprising a user equipment.

6. A method comprising:
receiving a first signal and a second signal from a further apparatus;
determining a third signal dependent on at least a first part of the first signal and a first part of the second signal, wherein the determining comprises summing the product of at least part of the first signal by a first weighting coefficient to the product of at least part of the second signal by a second weighting coefficient, and multiplying the sum by a first pilot pattern signal; and
generating a parameter value dependent on the third signal.

7. The method as claimed in claim 6, wherein the parameter value comprises at least one of:
a signal to noise ratio of a further signal associated with the first signal;
a signal to interference ratio of a further signal associated with the first signal; and
a signal to interference and noise ratio of a further signal associated with the first signal.

8. The method as claimed in claim 6, wherein the first signal comprises an estimate of a first pilot signal associated with the further apparatus first antenna.

9. The method as claimed in claim 6, wherein the second signal comprises an estimate of a second pilot signal associated with the further apparatus second antenna.

10. A non-transitory computer-readable medium encoded with instructions that, when executed by a computer, perform:
receiving a first signal and a second signal from a further apparatus;
determining a third signal dependent on at least a first part of the first signal and a first part of the second signal, wherein the determining comprises summing the product of at least part of the first signal by a first weighting coefficient to the product of at least part of the second signal by a second weighting coefficient, and multiplying the sum by a first pilot pattern signal; and
generating a parameter value dependent on the third signal.

* * * * *